US009669775B2

(12) United States Patent
Yamamoto

(10) Patent No.: US 9,669,775 B2
(45) Date of Patent: Jun. 6, 2017

(54) CLIP AND PILLAR GARNISH MOUNTING STRUCTURE

(71) Applicant: TOYOTA JIDOSHA KABUSHIKI KAISHA, Toyota-shi, Aichi-ken (JP)

(72) Inventor: Kazuhito Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 14/586,234

(22) Filed: Dec. 30, 2014

(65) Prior Publication Data

US 2015/0191131 A1 Jul. 9, 2015

(30) Foreign Application Priority Data

Jan. 9, 2014 (JP) ................................ 2014-002388

(51) Int. Cl.
*B60R 13/02* (2006.01)
*F16B 2/20* (2006.01)

(52) U.S. Cl.
CPC ............ *B60R 13/0206* (2013.01); *F16B 2/20* (2013.01); *Y10T 24/30* (2015.01)

(58) Field of Classification Search
CPC ......... B60R 13/0206; F16B 2/20; Y10T 24/30
See application file for complete search history.

(56) References Cited

U.S. PATENT DOCUMENTS

| 2,746,111 | A | * | 5/1956 | Chvosta | F16B 5/125 24/293 |
| 7,717,458 | B2 | * | 5/2010 | Tsuge | B60R 13/02 24/458 |
| 8,876,151 | B2 | * | 11/2014 | Yamamoto | B60R 13/0206 280/728.3 |
| 9,056,593 | B2 | * | 6/2015 | Risdale | B60R 21/216 |
| 9,302,632 | B2 | * | 4/2016 | Yamamoto | B60R 13/025 |
| 2004/0254608 | A1 | * | 12/2004 | Huitema | A61B 17/0644 606/219 |
| 2006/0032029 | A1 | * | 2/2006 | Nessel | B60R 13/0206 24/289 |
| 2006/0032030 | A1 | * | 2/2006 | Nessel | B60R 13/0206 24/289 |
| 2007/0075531 | A1 | * | 4/2007 | Tsuge | B60R 13/02 280/730.2 |
| 2007/0137004 | A1 | * | 6/2007 | Baekelandt | B60R 13/0206 24/289 |
| 2008/0014045 | A1 | | 1/2008 | Kawai | |
| 2013/0168515 | A1 | | 7/2013 | Yamamoto | |
| 2013/0257025 | A1 | | 10/2013 | Yamamoto | |

(Continued)

FOREIGN PATENT DOCUMENTS

EP 2722534 A1 4/2014
JP 2008-020006 A 1/2008

(Continued)

*Primary Examiner* — Robert J Sandy
*Assistant Examiner* — Louis Mercado
(74) *Attorney, Agent, or Firm* — Oliff PLC

(57) ABSTRACT

A clip has a base and a rattle inhibiting elastic piece. The base has a base portion that is separated from a clip central axis. The rattle inhibiting elastic piece has a slanted portion. The slanted portion extends at an angle with respect to the base, from the rattle inhibiting elastic piece portion that is provided adjacent to the base portion in a clip axial direction, toward a clip central axis side.

18 Claims, 12 Drawing Sheets

(56) References Cited

U.S. PATENT DOCUMENTS

| | | | |
|---|---|---|---|
| 2014/0319808 A1 | 10/2014 | Yamamoto | |
| 2015/0211555 A1* | 7/2015 | Yamamoto | B60R 13/0206 24/289 |
| 2016/0121836 A1* | 5/2016 | Yamamoto | F16B 19/1081 280/728.2 |

FOREIGN PATENT DOCUMENTS

| | | |
|---|---|---|
| JP | 2012-117640 A | 6/2012 |
| JP | 2013-113419 A | 6/2013 |
| JP | 2013-210018 A | 10/2013 |
| JP | 2014-009746 A | 1/2014 |
| WO | 2012/032603 A1 | 3/2012 |
| WO | 2014/020655 A1 | 2/2014 |

\* cited by examiner

CLIP AND PILLAR GARNISH MOUNTING STRUCTURE

INCORPORATION BY REFERENCE

The disclosure of Japanese Patent Application No. 2014-002388 filed on Jan. 9, 2014 including the specification, drawings and abstract is incorporated herein by reference in its entirety.

BACKGROUND OF THE INVENTION

1. Field of the Invention

The invention relates to a clip and a pillar garnish mounting structure using this clip. In this specification, the term "mounting structure" may be regarded as a mounting device.

2. Description of Related Art

Japanese Patent Application Publication No. 2013-113419 (JP 2013-113419 A) describes a clip and a pillar garnish mounting structure that uses this clip. The clip serves to attach a pillar garnish that houses a curtain airbag (hereinafter also referred to as a curtain shield airbag (CSA)) to a pillar, as well as to prevent the pillar garnish from flying out when the CSA is deployed.

The clip according to the related art (hereinafter also referred to as the "clip of the related art") includes a base, a body mounting portion (a shaft portion), and a collar portion (also referred to as a rattle inhibiting elastic piece, or an elastic piece). The body mounting portion is orthogonal to one side of the base. Also, the body mounting portion has an arm and a body retaining protrusion. The body retaining protrusion is formed on a portion of the arm that faces the base. The elastic piece extends in a radial shape from the center of the clip toward the outer periphery, and at an angle with respect to the base. When the body mounting portion is inserted into a body retaining hole and the clip is attached to the body, a body retaining hole peripheral edge portion of the body is sandwiched between the body retaining protrusion and the elastic piece. Therefore, looseness between the clip and the body is absorbed by elastic deformation of the elastic piece, so the clip is prevented from rattling against the body.

However, the clip according to the related art has the following issues. Because the elastic piece extends at an angle and in a radial shape from the center of the clip toward the outer periphery, the outer shape of the elastic piece becomes larger if a large elastic piece deformation allowance is to be ensured in the clip insertion direction. Therefore, the flat surface of the body required for the clip mounting seat becomes wider, so more clip mounting space is necessary.

Conversely, if the flat surface required for the clip mounting seat, and the space are kept down, the deformation allowance of the elastic piece in the direction of clip insertion will be unable to be made any larger. As a result, it is difficult to determine whether the clip is properly engaged with the body since reaction force of the elastic piece has rapidly increased immediately after the elastic piece contacts the body. It is difficult to determine whether the clip is not engaged (i.e., in a state in which both of a pair of engaging protrusions are not engaged) or is partially engaged (i.e., in a state in which one of the pair of retaining protrusions is not engaged). Also, a change in plate thickness of the body panel tends to not easily be absorbed due to deformation of the elastic piece.

SUMMARY OF THE INVENTION

The invention thus provides a clip that does not require that a flat surface of the body that is necessary for the clip mounting seat be widened in order to ensure a large elastic piece deformation allowance in the clip insertion direction, as well as a pillar garnish mounting structure that uses this clip.

A first aspect of the invention relates to a clip that includes a base and a rattle inhibiting elastic piece. The base has a base portion that is separated from a clip central axis. The rattle inhibiting elastic piece has a slanted portion. The slanted portion extends at an angle with respect to the base, from a rattle inhibiting elastic piece portion that is provided adjacent to the base portion in a clip axial direction, toward a clip central axis side.

A second aspect of the invention relates to a pillar garnish mounting structure that includes the clip of the first aspect of the invention, a pillar, and a pillar garnish. The pillar garnish is mounted to the pillar by the clip. The clip is a tether clip. A plane that includes the slanted portion of the rattle inhibiting elastic piece extends in a length direction of the pillar garnish.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
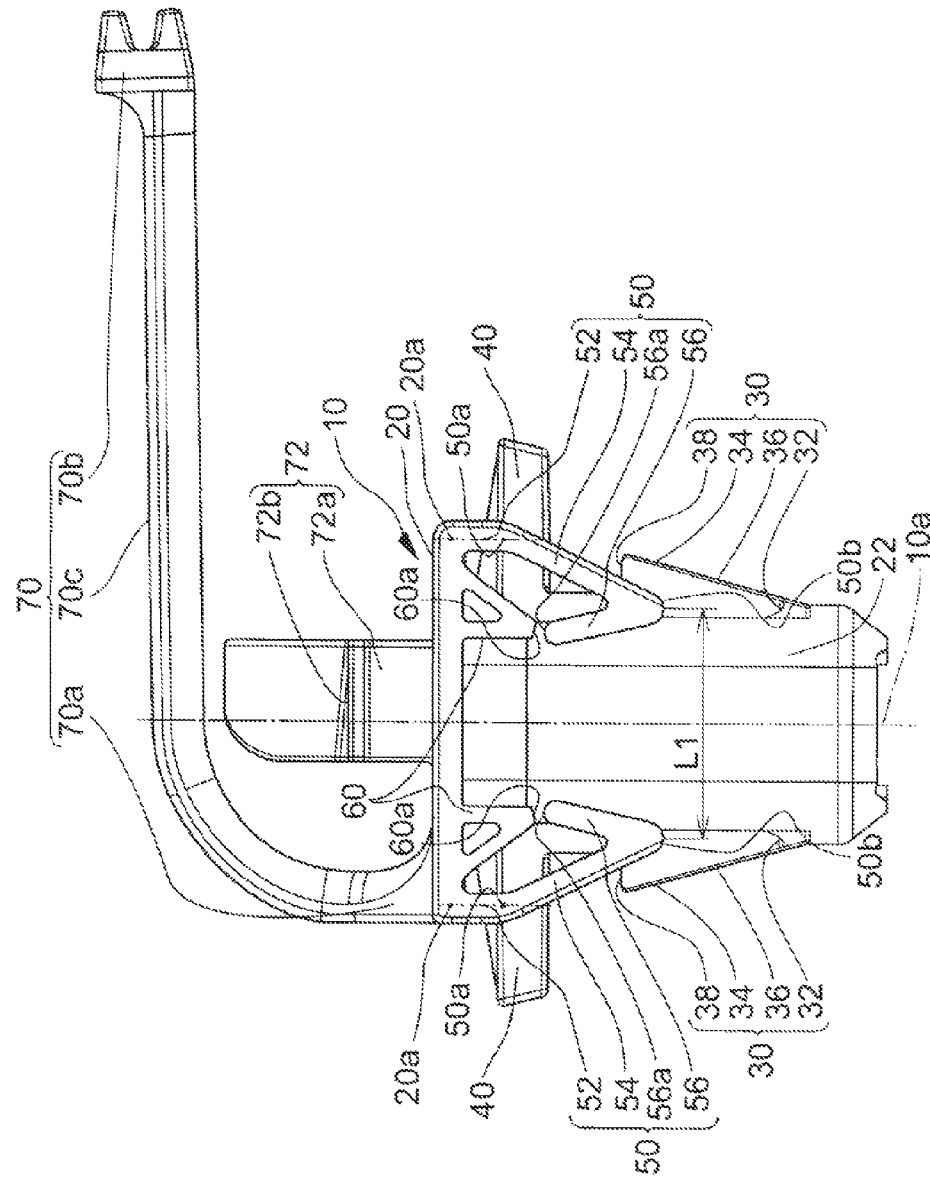
FIG. 1 is a front view of a clip according to a first example embodiment of the invention.

First, the general structure of the clip and pillar garnish mounting structure of the invention will be described.

According to a first structure of the invention, a clip 10 includes a base 20 and an elastic piece 50. The base 20 has a base portion 20a that is separated from a clip central axis 10a. The elastic piece 50 has a slanted portion 54. The slanted portion extends at an angle with respect to the base 20, from an elastic piece portion 50a that is provided adjacent to the base portion 20a in a clip axial direction toward a clip central axis 10a side.

Figure 2:
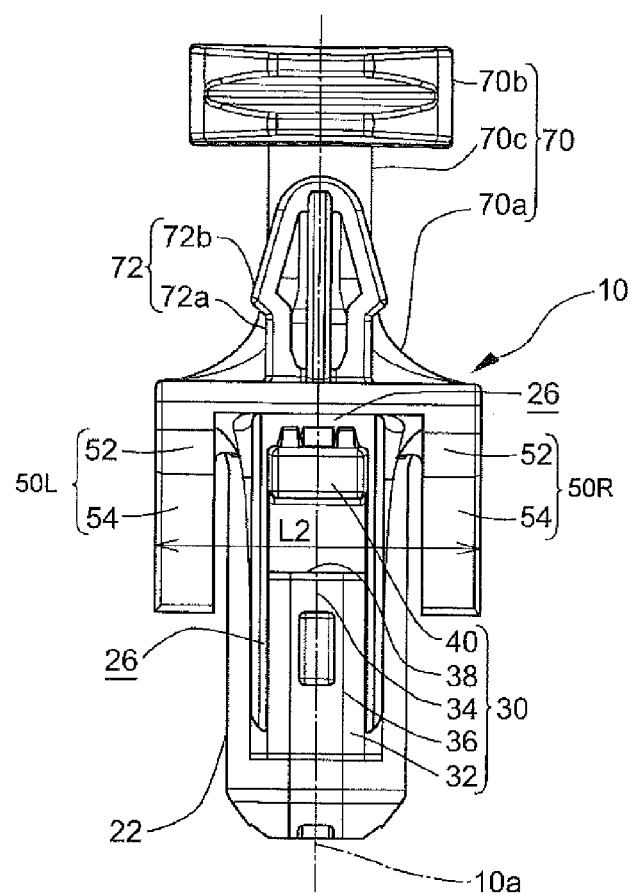
FIG. 2 is a side view of the clip shown in FIG. 1.

According to a second structure of the invention, the clip 10 of the first structure has an engagement release lever 40 that extends in a direction away from the clip central axis 10a. The elastic piece 50 is divided into a first portion 50L and a second portion 50R that sandwich a plane that includes an extending direction of the engagement release lever 40 and the clip axial direction (FIG. 2). In FIG. 2, the clip central axis 10a corresponds to the plane that includes an extending direction of the engagement release lever 40 and the clip axial direction. The engagement release lever 40 extends in a space between the first portion 50L and the second portion 50R.

According to a third structure of the invention, in the first structure or the second structure described above, an extended portion 56 or a protruding portion 60 is formed on at least one of the slanted portion 54 of the elastic piece 50 and the base 20, and extends in a direction toward the other of the slanted portion 54 and the base 20.

In the fourth structure of the invention, in any one of the first to the third structures, the clip 10 is a tether clip 10 configured to attach a garnish 80 to a pillar 90. The tether clip is attached to the pillar garnish. A plane that includes the slanted portion 54 of the elastic piece 50 extends in a length direction of the garnish 80.

According to a fifth structure of the invention, a pillar garnish mounting structure 1 includes the clip 10, the pillar 90, and the garnish 80 of one of the first to the third structures described above. The garnish 80 is attached to the pillar 90 with the clip 10. The clip 10 is a tether clip. Also, a plane that includes the slanted portion 54 of the elastic piece 50 extends in the length direction of the garnish 80.

With the clip according to the first structure, the slanted portion of the elastic piece extends at an angle with respect to the base from an elastic piece portion that is provided adjacent to the base portion in the clip axial direction toward the clip central axis side. Therefore, a required flat surface for the clip mounting seat, which is an area on the clip central axis side of an inside end of the slanted portion, is able to be narrower in a direction parallel to a plane that includes the slanted portion, thus enabling the clip mounting space to be made smaller. As a result, the required flat surface of the body for the clip mounting surface does not have to be made wider even if a larger elastic piece deformation allowance than that of the clip of the related art in the clip insertion direction is ensured.

With the clip according to the second structure, the engagement release lever extends in the space between the elastic piece that is divided into the first portion and the second portion, so the elastic piece will not impede operation of the engagement release lever when removing the clip. As a result, workability regarding the work of removing the clip at the time of servicing improves.

Figure 7:
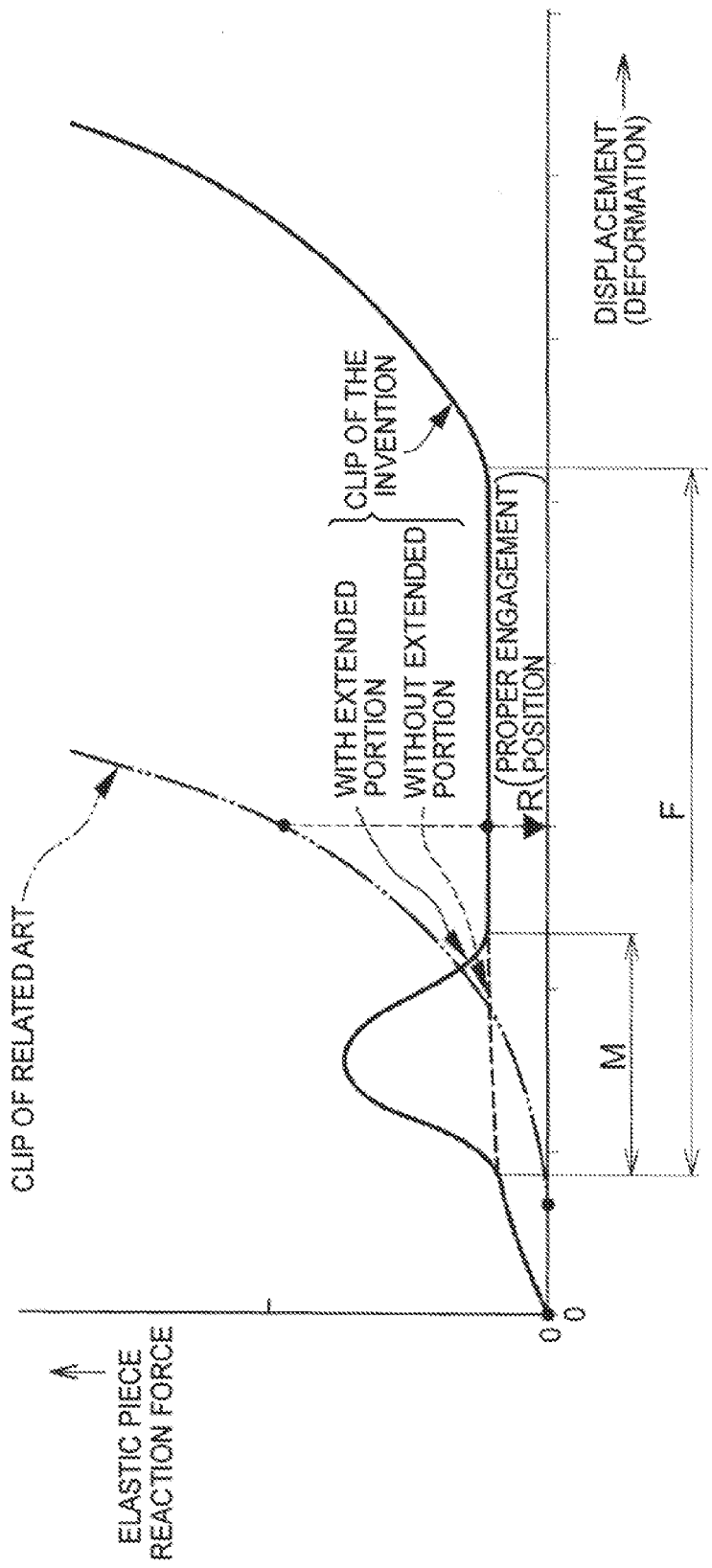
FIG. 7 is a view illustrating elastic piece displacement (deformation amount) with respect to elastic piece reaction force according to the example embodiments of the invention.

In the first and second structures, when a larger elastic piece deformation allowance than that of the clip according to the related art is ensured in the clip insertion direction, the characteristic of elastic piece displacement with respect to elastic piece reaction force that is shown in FIG. 7 is able to be obtained. As shown in FIG. 7, with the first and second structures, a region F where the change in the elastic piece reaction force with respect to the clip insertion amount is small (hereinafter, this region may also be referred to as the "flat region") is formed across a relatively wide elastic piece displacement area. Also, a proper engagement position R of the clip to the body a position where the pair of retaining protrusions engages with the body retaining peripheral edge portion) is able to be set in this region F. As a result, non-engagement and partial engagement due to a sudden increase in elastic piece reaction force such as that of the clip according to the related art is more easily able to be prevented. Non-engagement and partial engagement that occur when the clip stops being pushed in midway in the flat region can be dealt with by the third structure described below.

With the clip according to the third structure, the extended portion or the protruding portion is formed on at least on at least one of the slanted portion of the elastic piece and the base, and extends toward the other of the slanted portion and the base. Therefore, a mountain M (i.e., a portion where an insertion load intentionally increases shown in FIG. 7) is able to be formed locally in the flat region of the characteristic of the elastic piece displacement with respect to the elastic piece reaction force. The mountain M appears when the extended portion or the protruding portion formed on the slanted portion of the elastic piece directly contacts the other of the slanted portion and the seated portion, or the extended portion or the protruding portion formed on the other of the slanted portion and the base, when the clip is being inserted into the body retaining hole.

This mountain may be used to inhibit non-engagement or partial engagement of the clip with the body, as described below. When the push-in force or the push-in amount of the clip is insufficient, insertion of the clip may stop in the mountain region. In this case, a part (such as a pillar garnish) that is attached using the clip sits higher than the surrounding parts, so it is visually apparent from the external appearance that the clip is either not engaged or partially engaged. In this case, the clip simply need be pushed in further. When the push-in force of the clip is sufficient, the clip is able to be pushed in all at once to the proper engagement position by the momentum when the insertion force of the clip overcomes the mountain. Also, there is a click feeling when passing the mountain, so the clip is able to be inhibited from stopping before the proper engagement position when it is being inserted, by feeling the click feeling and pushing the clip in further.

With the clip according to the fourth structure, a plane that includes the slanted portion of the elastic piece extends in the length direction of the pillar garnish, so the flat surface required for the clip mounting seat is reduced in only the length direction of the pillar garnish. The pillar garnish tends to become rattling in the length direction thereof around clip following the reduction in the flat surface required for the clip mounting seat, but normally this rattling is able to be suppressed by the pillar garnish abutting against the body in the pillar garnish length direction, so there is little effect from the pillar garnish rattling in the length direction thereof is small. The external dimensions of the two divided elastic pieces are not able to be reduced in the width direction of the pillar garnish. Therefore, rattling suppression of the pillar garnish in the width direction thereof is maintained at the same extent as that of the clip of the related art.

With the pillar garnish mounting structure according to the fifth structure, the clip of the fourth structure is used, so the same or a similar effect as that with the clip of the fourth structure is able to be obtained.

Figure 3:
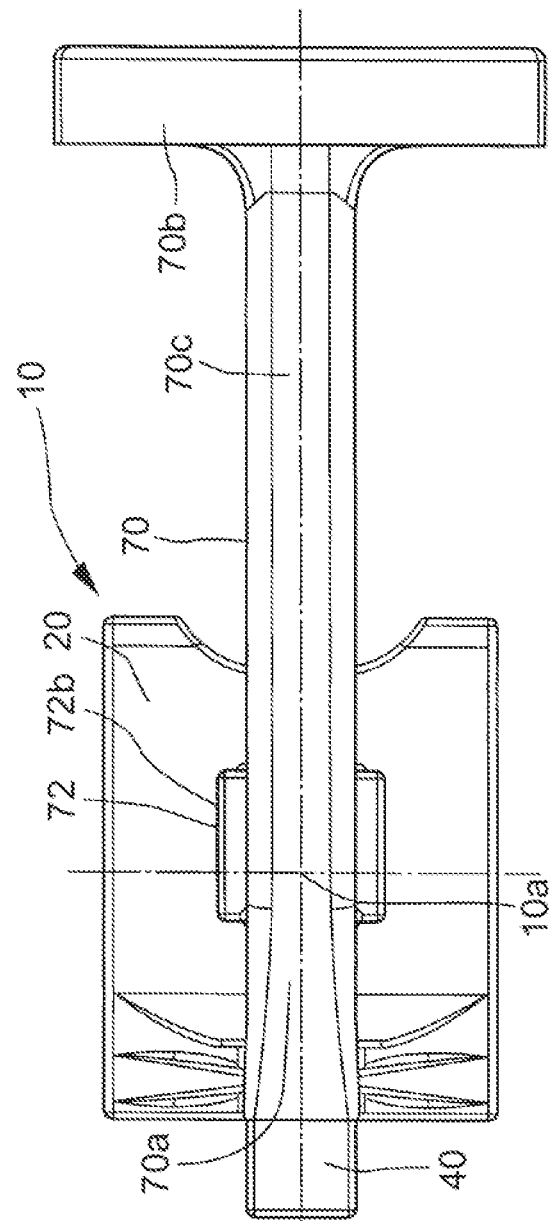
FIG. 3 is a plan view of the clip shown in FIG. 1, and is applied correspondingly as a plan view of a clip shown in FIG. 8.
Figure 4:
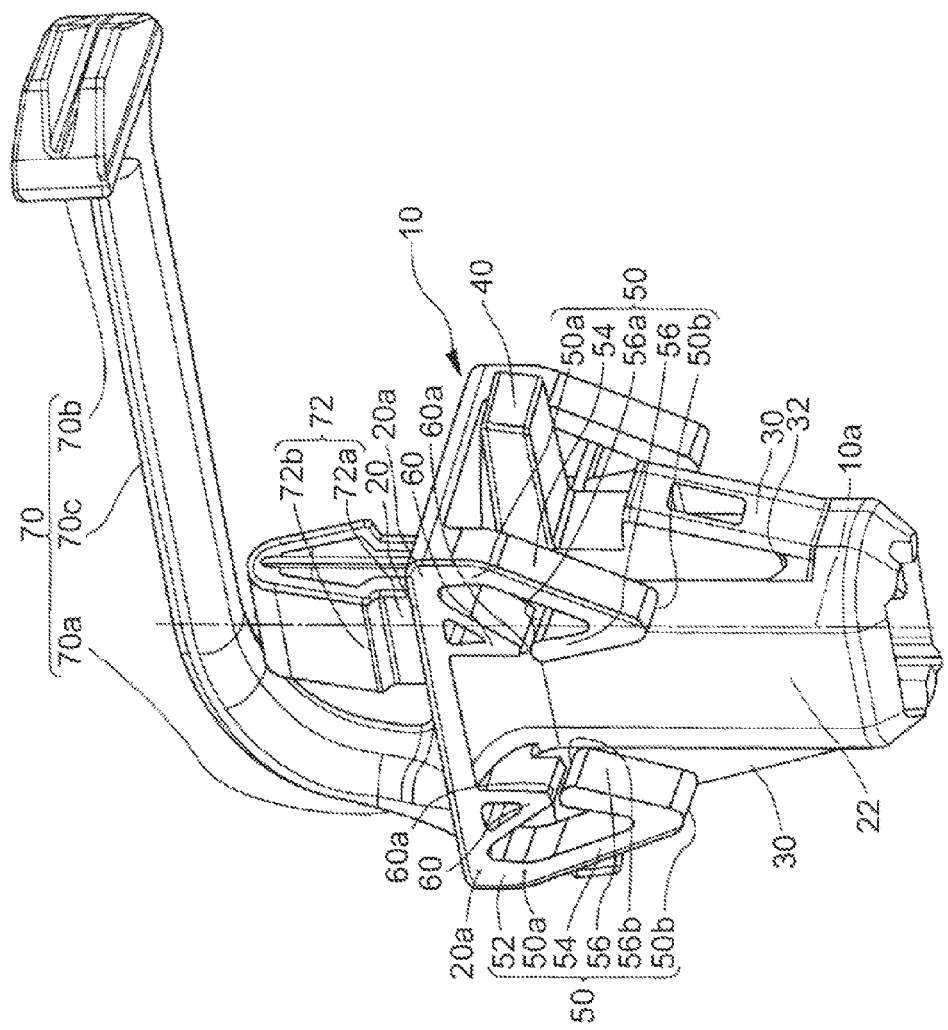
FIG. 4 is a perspective view of the clip shown in FIG. 1.
Figure 5:
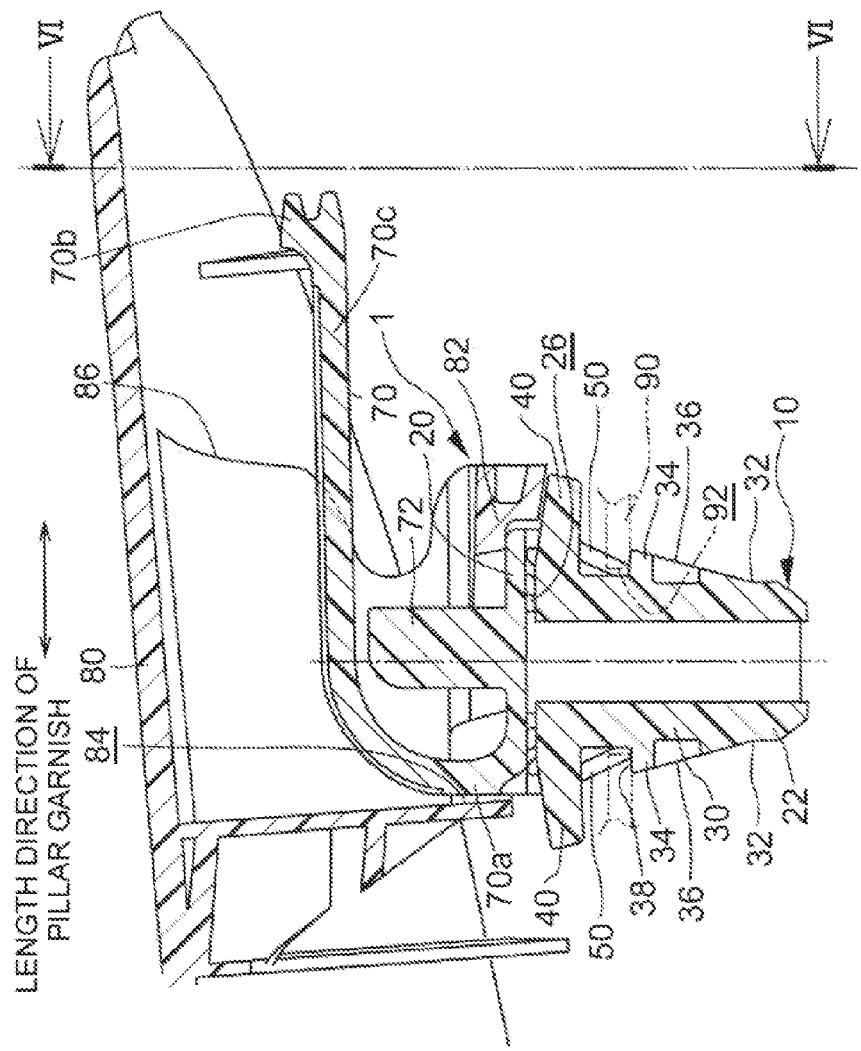
FIG. 5 is a sectional view of a pillar garnish mounting structure using a clip according to example embodiments of the invention.
Figure 6:
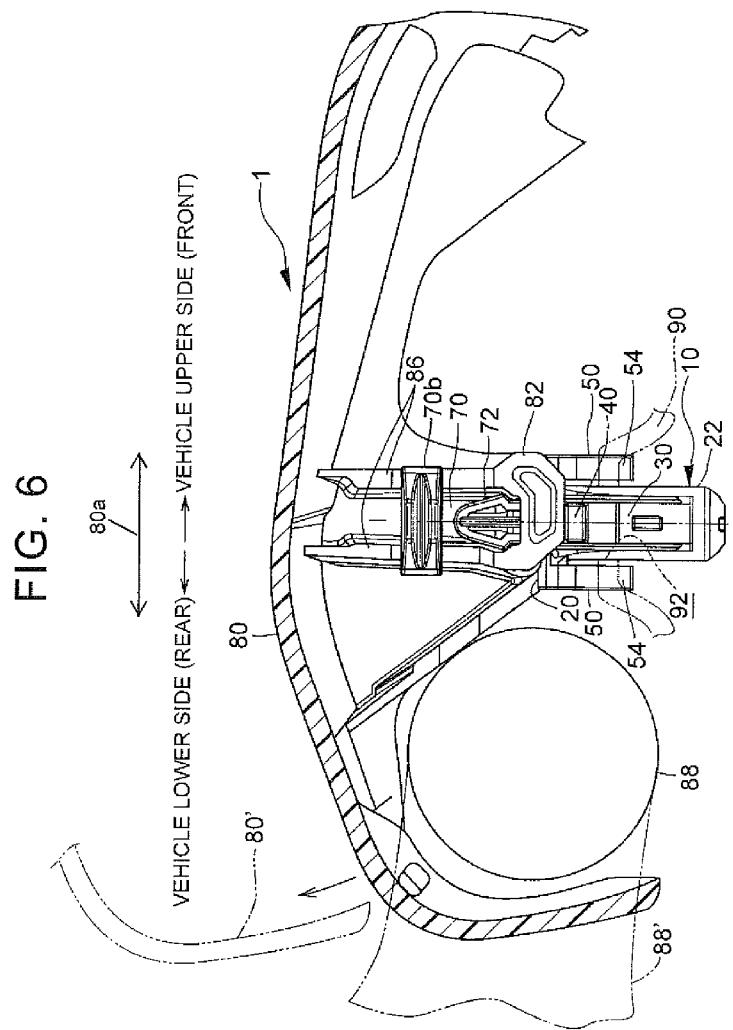
FIG. 6 is an enlarged sectional view of the pillar garnish mounting structure in FIG. 5 taken along line VI-VI.

A clip 10, and a pillar garnish mounting structure 1 in which, when the clip 10 is a tether clip, a pillar garnish is attached to a body using this tether clip, according to one example embodiment of the invention will be described with reference to FIGS. 1 to 12. The main portion of the pillar garnish mounting structure 1 is the clip 10, so the main portions of the clip 10 and the pillar garnish mounting structure 1 are the same. FIGS. 1 to 4 and 7 to 12 relate to the clip 10, and FIGS. 5 and 6 relate to the pillar garnish mounting structure 1. FIGS. 1 to 4 relate to a first example embodiment of the invention, FIGS. 8 to 10 relate to a second example embodiment of the invention, and FIGS. 11 and 12 relate to a third example embodiment of the invention. FIGS. 5 to 7 are applied, or are applied correspondingly to all of the example embodiments of the invention. Component parts common among all of the example embodiments of the invention will be denoted by like reference characters among all of the example embodiments of the invention.

[First Example Embodiment]

First, the structures of the clip 10 and the pillar garnish mounting structure 1 according to a first example embodiment of the invention will be described, together with their operation, with reference to FIGS. 1 to 7. In the illustrated example, the clip 10 is shown as a tether clip 10 that fixes a pillar garnish to a body (this tether clip is the same as the clip, and thus will be denoted by the same reference character used to denote the clip). However, the clip 10 may also be a clip other than the tether clip 10. For example, the clip may also be a normal retaining clip that fixes a CSA to a body.

The clip 10 is made of flexible resin material. The resin material is polyhexamethylene adipamide, for example. Another resin material may also be used as long as it is flexible and has the necessary strength.

As shown in FIGS. 1 to 4, the clip 10 has a clip central axis 10a that extends in a clip axial direction. The clip 10 has a base 20 that is orthogonal to the clip central axis 10a, and one or more rattle inhibiting elastic pieces (hereinafter, also simply referred to as "elastic piece" or "elastic pieces") 50. The elastic piece 50 absorbs looseness between the clip 10 and a body 90 when the clip 10 is attached to the body 90, with elastic deformation of the elastic piece 50, and thus inhibits the clip 10 from raffling against the body 90. The elastic piece 50 may also be integrally formed with the clip 10, as it is in the example, or it may be firmed on a separator that is separate from the clip 10.

The clip 10 may also include a shaft portion (which may also be referred to as a leg portion or a body mounting portion) 22, and a retaining protrusion 30. The shaft portion 22 extends from the base 20 in a direction orthogonal to the base 20. The retaining protrusion 30 has a connecting portion 32 that is connected to the shaft portion 72 in a position away from the base 20 in the clip axial direction. The retaining protrusion 30 extends from the connecting portion 32 toward the base 20 and ends at a free end. A body retaining surface 38 is formed on the free end of the retaining protrusion 30. The shaft portion 22, the retaining protrusion 30, and the elastic piece 50 are at the same side of the base 20 in the clip axial direction.

The central axis of the shaft portion 22 is aligned with the clip central axis 10a of the clip 10. The shaft portion 22 is hollow. The outer shape of a cross-section of the shaft portion 22 in a direction orthogonal to the clip central axis 10a is generally rectangular or generally round. Generally rectangular includes a square or rectangular shape with rounded corners. The illustrated example shows the outer shape of the cross-section of the shaft portion 22 being generally rectangular.

Two openings are provided in portions of the shaft portion 22 that face each other across the clip central axis 10a. The retaining protrusions 30 are provided one in each of the openings. The retaining protrusions 30 face each other in a direction orthogonal to the clip axial direction, and are symmetrical about the clip central axis 10a.

Each retaining protrusion 30 is separated by a slit 26 from the base 20 and the shaft portion 22, except for at the connecting portion 32 that is connected to the shaft portion 22. That is, there is an inverted U-shaped slit 26 between the retaining protrusion 30, and the base 20 and the shaft portion 22, except for at the connecting portion 32 that is connected to the shaft portion 22. An axial position of an end portion of the slit 26 at the side away from the base 20 matches, or substantially matches, an axial position of the connecting portion 32. The retaining protrusion 30 is able to elastically deform in a direction toward and away from the clip central axis 10a, i.e., in a direction in which it bends and stands erect around the connecting portion 32, because the clip 10 is made of flexible resin material.

Each retaining protrusion 30 has a protruding portion 34 and an engagement release lever 40. The protruding portion 34 and the engagement release lever 40 are separated from each other in the clip axial direction. The protruding portion 34 protrudes out farther in a direction away from the clip central axis 10a than the outer surface of the shaft portion 22, when the retaining protrusion 30 is in a free state, i.e., when a load is not being applied to the retaining protrusion 30. That is, a portion of the retaining protrusion 30 that protrudes out farther in a direction away from the clip central axis 10a than the outer surface of the shaft portion 22 is the protruding portion 34. The protruding portion 34 has a sliding surface 36 that is slanted away from the clip central axis 10a, from the connecting portion 32 toward a base 20 side tip end portion of the retaining protrusion 30, on at least a portion of the protruding portion 34 in the clip axial direction. This sliding surface 36 becomes a sliding surface that slides on a body retaining hole 92 (also referred to as a clip mounting hole) inside surface when the clip 10 is inserted into the body retaining hole 92. The point where the sliding surface 36 starts to slant may be at the connecting portion 32, or it may be at a position away from the connecting portion 32 in the clip axial direction.

The retaining protrusion 30 bends and deforms in a direction toward the clip central axis 10a when the sliding surface 36 is pushed on by the inside surface of the body retaining, hole 92 as the clip 10 is inserted into the body retaining hole 92 of a body 90 (such as an inner panel of a pillar). Also, the retaining protrusion 30 elastically returns to its original position (i.e., the position when it is in a free state) when the retaining protrusion 30 has passed through the body retaining hole 92. After elastically returning to its original position, the body retaining surface 38 that is a base-facing surface of the protruding portion 34 of the retaining protrusion 30 engages with the portion of the body 90 which is close to the retaining hole 92, such that the clip 10 will not come out of the body retaining hole 92, or will not come out of the body retaining hole 92 easily. The body 90 is located between the body retaining surface 38 and slanted portion 54 in the clip axial direction. The slanted portion 54 will hereinafter be described in detail.

The engagement release lever 40 is provided on each retaining protrusion 30. The engagement release lever 40 is provided on a retaining protrusion tip end portion on the side near the base 20 in the clip axial direction, and extends away from the clip central axis 10a at substantially a right angle to the clip central axis 10a. A tip end of the engagement release lever 40 is positioned farther away from the clip central axis 10a than an outside end of the protruding portion 34 is. Also, the tip end of the engagement release lever 40 is positioned farther away from the clip central axis 10a than an outside end of the base 20 is in the same direction.

When removing the clip 10 from the body retaining hole 92 when servicing, the engagement release levers 40 of the retaining protrusions 30 are pushed toward each other until the distance between the outside surfaces of the protruding portions 34 is the same or less than the distance between opposite inside surfaces of the body retaining hole 92, and then the clip 10 is pulled in the clip axial direction so that the shaft portion 22 is pulled out of the body retaining hole 92.

The elastic piece 50 has the slanted portion 54. The slanted portion 54 extends at an angle with respect to the base 20, from an elastic piece portion 50a that is provided adjacent to a base portion 20a in a clip axial direction, toward the clip central axis. 10a side, and away from the base 20. The base portion 20a is a portion of the base 20, and is separated from the clip central axis 10a.

In the above description, the elastic piece portion 50a may be a portion of the clip 10 itself, or a portion of a separator that is separate from the clip 10. Also, when the elastic piece 50 is integrally formed with the base 20, the elastic piece portion 50a may be an elastic piece portion that is aligned with the base portion 20a in the clip axial direction, or it may be an elastic piece portion that is separated from the base portion 20a in the clip axial direction by the length of an axial portion 52 that will be described later., The elastic piece 50 is provided at opposite sides across the clip central axis 10a, as shown in FIG. 1, in a direction parallel to a plane that includes the slanted portion 54. Also, the elastic piece 50 is provided at opposite sides across the clip central axis 10a, as shown in FIG. 2, in a direction orthogonal to a plane that includes the slanted portion 54. Thus, a total of four of the elastic pieces 50 are provided, as shown in FIG. 4.

The slanted portion 54 extends at an angle toward the clip central axis 10a side and away from the base 20, as shown in FIG. 1, in a direction parallel to a plane that includes the slanted portion 54. Therefore, the distance between the slanted portions 54 of the elastic piece 50 at opposite sides across the clip central axis 10a. becomes narrower farther away from the base 20. The distance between tip ends 50b of the slanted portions 54 of the elastic pieces 50 at the side away from the base 20 will be denoted L1. When the external dimension of the base 20 is L0, not shown, in a plane that includes the slanted portions 54, the distance L1 is equal to or less than L0. With a clip of the related art having a slanted portion that is slanted away from the clip central axis as the distance from the base increases, the dimension between the tip end portions of the slanted portions the dimension corresponding to L1 of the invention) is larger than the external dimension L0 of the base. Also, the distance L1 corresponds to one side of the area required for the rectangular clip mounting seat of the body 90. Therefore, the area required for the clip mounting seat of the body 90 is smaller than the area required for the clip mounting seat in a clip of the related art having a slanted portion that is slanted away from the clip central axis as the distance from the base increases.

The slanted portion 54 extends at an angle toward the clip central axis 10a side. Therefore, even if a large elastic piece deformation allowance is ensured in the clip insertion direction by making a length component of the elastic piece 50 in the clip axial direction larger than that of the clip of the related art, the flat surface required for the clip mounting seat will not be wider than that of the clip of the related art. Also, by making the elastic piece deformation allowance greater than that of the clip of the related art, a region F where the change in the elastic piece reaction force with respect to the clip insertion amount is small (i.e., the flat region F) is able to be formed across a wide elastic piece deformation area, in the characteristic of the elastic piece displacement with respect to the elastic piece reaction force in FIG. 7. Also, by making the elastic piece deformation allowance larger than it is with the clip of the related art, the elastic piece 50 according to the example embodiment of the invention abuts against the body 90 before the elastic piece of the clip of the related art does. A proper engagement position R of the clip 10 with respect to the body 90 is set in this flat region F. As a result, the clip 10 is able to be pushed in with low reaction force across a long stroke before the proper engagement position R. Thus, the insertability of the clip 10 into the body retaining hole 92 improves. With the clip according to the related art, the elastic piece is slanted toward the outside, so if the elastic piece is made longer, the flat surface required for the clip mounting seat becomes wider, and as a result, the elastic piece deformation allowance is unable to be increased without widening the flat surface required for the clip mounting seat.

The rattling suppressing operation of the clip 10 with respect to the body 90 is reduced compared to the clip of the related art in a direction parallel to the plane that includes the slanted portion 54 by reducing the distance L1, which is accomplished by having the slanted portion 54 extend at an angle toward the clip central axis 10a side. However, rattling is inhibited by a mounting member such is i pillar garnish) 80 abutting against another member, e.g., the body 90, at a portion other than the clip 10 portion, in the length direction of the mounting member 80, so the effect from rattling in the length direction of the mounting member 80 is small. A direction in which the effect of the mounting member 80 increases is normally a width direction of the mounting member 80, i.e., a direction orthogonal to the plane that includes the slanted portion 54.

When viewed from the extending direction of the engagement release lever 40, i.e., when viewed from a direction perpendicular to the paper on which FIG. 2 is drawn, the slanted portion 54 is orthogonal to the base 20, as shown in FIG. 2. The distance between the slanted portions 54 at opposite sides across the clip central axis 10a is constant in a direction orthogonal to the plane that includes the slanted portion 54. When the distance between outer surfaces of the slanted portions 54 in a direction orthogonal to the plane that includes the slanted portion 54 is denoted L2, L2 is set larger than L1. Therefore, the distance between the outside surfaces of the slanted portions 54 may be set to be the same, or substantially the same, as the distance between outside surfaces of the slanted portions of the clip of the related art. In this case, the rattling suppression operation of the mounting member 80 with respect to the body 90 by the clip 10 is maintained to the same extent as with the clip of the related art.

The elastic pieces 50 are provided symmetrically about the clip central axis 10a, as shown in FIG. 1, in a direction parallel to the plane that includes the slanted portion 54. The elastic piece 50 provided at each side of the clip central axis 10a is divided into two in a direction orthogonal to the plane that includes the slanted portion 54, as shown in FIG. 2. A space is provided between the two divided elastic pieces 50, and the engagement release lever 40 is arranged in this space. The engagement release lever 40 extends in a direction parallel to the plane that includes the slanted portion 54.

Because the space is provided between the two divided elastic pieces 50 in the direction orthogonal to the plane that includes the slanted portion 54, when the distance L2 between the outside surfaces of the two elastic pieces 50 is the same as it is with the clip of the related art, the width of each elastic piece 50 is narrower than the width of the elastic piece of the clip of the related art that is not divided. As a result, the bending rigidity of the elastic piece 50 is smaller than it is with the clip of the related art, so the reaction force when the elastic piece 50 elastically deforms in the clip axial direction is smaller. Therefore, as shown in FIG. 7, the combined reaction force-to-displacement amount (deformation amount) characteristic of the four elastic pieces 50 is easily flat across the wide displacement region F both at and before the proper engagement position of the clip 10 with respect to the body 90. The reaction force-to-displacement amount characteristic of the clip of the related art rises at a steep gradient, as shown by the alternate long and two short dashes line in FIG. 7.

The elastic piece 50 may also have an axial portion 52 that extends in the clip axial direction from the base side end portion of the slanted portion 54 toward the base 20 side. In the illustrated example, the elastic piece 50 is shown having the axial portion 52. When the elastic piece 50 has the axial portion 52, the axial portion 52 extends between the base 20 and the slanted portion 54. When the elastic piece 50 does not have the axial portion 52, the slanted portion 54 may be directly connected to the base 20.

Non-engagement and partial engagement of the clip due to the elastic piece reaction force suddenly rising as it does with the clip of the related art is inhibited by providing the flat region F. However, by providing the flat region F, the clip may stop being pushed in before the proper engagement position R, which may result in the clip being non-engaged or partially engaged. The structure described below is employed in order to prevent this from happening.

An extended portion 56 or a protruding portion 60 is formed on at least one of the slanted portion 54 of the elastic piece 50 and the base 20, and extends toward the Other of the slanted portion. 54 and the base 20. For example, the extended portion 56 is formed on the slanted portion 54, and the protruding portion 60 is formed on the base 20. As a result, a localized mountain (i.e., a portion where the insertion load becomes large) M is able to be formed in the flat region F formed in the characteristic of the elastic piece displacement with respect to the elastic piece reaction force, as shown in FIG. 7. For example, the mountain M appears when the extended portion 56 abuts against the protruding portion 60 when the clip is inserted into the body retaining hole. At the beginning of abutment, the mountain M rises, and the mountain M falls when the abutting portion slides and fills out of abutment or the extended portion 56 or the protruding portion 60 deforms. The position of the mountain M is able to be set appropriately by the distance between the two abutting surfaces. The height of the mountain M is able to be set by the degree of difficulty with which the two abutting surfaces come apart, or the degree of difficulty with which the extended portion 56 or the protruding portion 60 deforms.

Non-engagement or partial engagement of the clip 10 with respect to the body 90 is able to be suppressed more by using this mountain M than it is when the mountain is not formed. More specifically, when the clip 10 is inserted into the body retaining hole 92 of the body 90, there is a click feeling when the mountain M is passed, and when the clip 10 is pushed in further, the clip 10 is properly engaged with the body retaining hole 92 by the elastic pieces 50 deforming further. When the clip 10 is properly engaged, the body retaining surface 38 surface-contacts the peripheral edge portion of the body retaining hole 92 in the body 90. Even if the clip stops being pushed in at the position of the mountain M such that the clip 10 is non-engaged or partially engaged with the body 90, this is able to be easily recognized by setting the position of the mountain M a predetermined distance in front of the proper engagement position R, and setting this predetermined distance to an amount (such as 2 mm or more) at which it is easy to visually determine that the mounting member 80 is sitting higher than the surrounding members. In this case, non-engagement or partial engagement call be prevented by pushing the clip 10 in further. Also, there is a click feeling when the mountain M is passed, so by firmly pushing in the clip 10 all at once from the point at which the click feeling is obtained when the clip 10 is pushed into the body retaining hole 92, the clip 10 is able to be pushed into the proper engagement position R without it stopping at the mountain M or midway through the flat region F.

Next, an additional structure of the clip 10 when the clip 10 is a tether clip (which is the same as the clip, so the tether clip will also be denoted by the reference character 10), as well as the structure of the pillar garnish mounting structure 1 that uses the clip 10, will be described together with the operation thereof. The pillar garnish mounting structure 1 includes a tether clip 10, a pillar 90 that is a body (the pillar will also be denoted by reference character 90), and a pillar garnish 80 that is a mounting member that is attached to the pillar 90 using the tether clip 10.

The pillar garnish 80 is made of plastic that is as rigid or more rigid than the clip 10. As shown in FIGS. 5 and 6, the pillar garnish 80 is attached to an inner panel of the pillar 90 by the tether clip 10. The length direction of the pillar garnish 80 is oriented in the same direction as the length direction of the pillar 90. The pillar garnish 80 has a bottom wall 82 and at least two engaging walls 86. A rectangular tether portion insertion hole 84 is provided in the bottom wall 82. A CSA 88 is housed folded up in a back space of the pillar garnish 80. When a vehicle collision occurs, the CSA 88 deploys and inflates, pushing the pillar garnish 80 toward the vehicle cabin side, such that a deployment gap forms between the pillar garnish 80 and the pillar 90. The CSA 88 passes through this gap and deploys between an occupant and a side door, thereby protecting the head of the occupant. Reference character 88' in FIG. 6 denotes a portion of the CSA during deployment, and reference character 80' in FIG. 6 denotes a portion of the pillar garnish that has been pushed away.

As shown in FIGS. 1 to 3 and FIGS. 5 and 6, the tether clip 10 has a tether portion 70 and an engagement retaining portion 72. The tether portion 70 preferably extends in the length direction of the pillar garnish 80, but may also extend in a direction orthogonal to the length direction of the pillar garnish 80. The engagement retaining portion 72 rises from a center portion of the base 20, while the tether portion 70 rises from a portion closer to an end portion of the base 20 than the engagement retaining portion 72. One tether portion 70 and one engagement retaining portion 72 are provided to the tether clip 10. The center of the tether portion 70 and the center of the engagement retaining portion 72 are preferably provided in the same plane that extends in the length direction of the pillar garnish 80. The tether portion 70 and the engagement retaining portion 72 are provided separated from each other.

The tether portion 70 includes a rising portion 70a that rises from the base 20 at the side opposite the shaft portion 22, an anchor portion 70b provided on a tip end at the side away from the base 20, and a connecting portion 70c that connects the rising portion 70a to the anchor portion 70b. At least a portion of the connecting portion 70c in the length direction may be curved. The direction of the curvature of the connecting portion 70c is preferably the length direction of the pillar garnish 80, but it may also be a direction orthogonal to the length direction of the pillar garnish 80. By orienting the direction of curvature of the connecting portion 70c in the length direction of the pillar garnish 80, the connecting portion 70c is able to be made longer, so the deployment gap between the pillar garnish 80 and the pillar 90 when the CSA 88 deploys is able to be larger.

The anchor portion 70b is inserted through the tether portion insertion hole 84 of the bottom wall 82 of the pillar garnish 80, as well as through the space between the engaging walls 86, and extends out from between the engaging walls 86 and is rotated 90 degrees, so as to be retained by the end surface of the engaging walls 86 when the CSA deploys. With the tether clip 10 attached to the pillar garnish 80, the shaft portion 22 of the tether clip 10 is pushed into the body retaining hole 92 of the pillar 90, such the pillar garnish 80 with the tether clip 10 is attached to the pillar 90.

The engagement retaining portion 72 rises from the base 20 in a direction opposite the shaft portion 22. The engagement retaining portion 72 has a rising portion 72a and a bulging portion 72b. The rising portion 72a rises from the base 20 by an amount substantially equal to the thickness of the peripheral edge portion of the tether portion insertion hole 84 of the bottom wall 82. The bulging portion 72b extends in a direction even farther away from the base 20 from a tip end of the rising portion 72a and bulges out in a direction orthogonal to the rising direction of the rising portion 72a. The bulging portion 72b is formed in a hollow shape so as to have elasticity in the direction orthogonal to the rising direction.

When attaching the tether clip 10 to the pillar garnish 80, the engagement retaining portion 72 is pushed into the tether portion insertion hole 84 of the bottom wall 82. At this time, the bulging portion 72b elastically deforms in a direction that reduces the bulge amount, and passes through the tether portion insertion hole 84. When the bulging portion 72b passes through the tether portion insertion hole 84 the bulging portion 72b elastically returns to its original position (the position when the bulging portion 72b is in a free state), such that the bottom wall 82 is retained between the bulging portion 72b and the base 20. The tether clip 10 is attached to the pillar 90 while this state is maintained.

When the CSA deploys, the pillar garnish 80 is pushed away from the pillar 90 by the deployed CSA 88. At this time, the peripheral edge portion of the tether portion insertion hole 84 pushes the bulging portion 72b of the engagement retaining portion 72 in a direction in which the bulging portion 72b will come out, thereby elastically deforming the bulging portion 72b in a direction in which the bulge amount is reduced. The bulging portion 72b then passes through the tether portion insertion hole 84, and the bottom wall 82 comes away from the bulging portion 72b of the engagement retaining portion 72. As a result, the pillar garnish 80 moves until the anchor portion 70b of the tether portion 70 abuts against a length-direction end surface of the pillar garnish of the engaging walls 86, creating a deployment gap for the CSA 88 between the pillar garnish 80 and the pillar 90. The CSA 88 passes through this deployment gap between the pillar garnish 80 and the pillar 90 and is deployed into the vehicle cabin between the occupant and the side door thereby restraining and protecting the head of the occupant.

When the anchor portion 70b abuts against the length-direction end surface of the pillar garnish of the engaging walls 86 when the CSA deploys, the pillar garnish 80 is unable to move any further and therefore is prevented from flying into the vehicle cabin. The structure and operation described above may be commonly applied to all example embodiments of the invention.

The clip 10 according to the first example embodiment of the invention has the structure and operation described below in addition to the structure and operation described above. As shown in FIGS. 1 to 4, the elastic piece 50 has the axial portion 52, the slanted portion 54, and the extended portion 56. The base 20 has the protruding portion 60 that protrudes on the shaft portion 22 side.

The axial portion 52 of the elastic piece 50 extends in the clip axial direction from the base portion 20a positioned on the end portion of the base 20. The slanted portion 54 of the elastic piece 50 extends at an angle with respect to the base 20, from the elastic piece portion 50a positioned on an end portion of the axial portion 52 at the side away from the base 20, in a direction toward the clip central axis 10a and away from the base 20. The extended portion 56 extends at an angle with respect to the base 20, from the end portion of the slanted portion 54 that is at the side away from the base 20, in a direction toward the clip central axis 10a and toward the base 20 in the clip axial direction. The elastic piece 50 is supported at only one end, so the elastic piece 50 bends (i.e., deforms) across a wider stroke with low reaction force than the clip of the related art, toward the base 20 side when the end portion 50b of the slanted portion 54 of the elastic piece 50 that is at the side away from the base 20 abuts against the body 90 and is pushed when installing the clip 10 to the body 90. As a result, the elastic piece 50 has a flat region F where the reaction force is low across a wider displacement region than the clip of the related art, in the characteristic of elastic piece reaction force with respect to elastic piece displacement shown in FIG. 7.

In the plane that includes the slanted portion 54, the protruding portion. 60 has a generally triangular shape that tapers away from the base 20. When the clip 10 is installed to the body 90, the end portion 50b of the slanted portion 54 of the elastic piece 50 abuts against the body 90 and is pushed such that the elastic piece 50 and the extended portion 56 elastically deform toward the base 20 side. A tip end portion 60a of the protruding portion 60 is provided in a position where a tip end portion 56a of the extended portion 56 that is at the base 20 side touches the tip end portion 60a. As a result, a mountain M appears when the tip end portion 56a of the extended portion 56 touches the tip end portion 60a of the protruding portion 60, in the flat region F in the characteristic of elastic piece reaction force with respect to elastic piece displacement in FIG. 7. The mountain M rises when the tip end portion 56a touches the tip end portion 60a of the protruding portion 60, and falls when the tip end portion 56a comes away from the tip end portion 60a of the protruding portion 60 and slides on the surface of the protruding portion 60. This mountain M is able to be used to inhibit non-engagement and partial engagement of the clip 10.

Next, the effects of the clip 10 and the pillar garnish mounting structure 1 that uses the clip 10 according to the first example embodiment will be described.

First, the slanted portion 54 of the elastic piece 50 extends at an angle with respect to the base 20 toward the clip central axis 10a side from the elastic piece portion 50a. that is provided adjacent to the base portion 20a, which is away from the clip central axis 10a, in the clip axial direction. Therefore, the flat surface required for the clip mounting seat, which is the area (L1×L2) of the inside end of the slanted portion 54 or to the inside thereof, is smaller than it is with the clip of the related art, so the space required for mounting the clip is able to be smaller. As a result, even if the length component of the elastic piece 50 in the clip axial direction is made larger than that of the clip of the related art and a large deformation allowance of the elastic piece 50 is ensured in the clip insertion direction, the flat surface required for the clip mounting seat will not be wider than that of the clip of the related art. With the clip of the related art, the elastic piece is slanted outward, so if the length of the elastic piece is increased to ensure a large elastic piece deformation allowance in the clip insertion direction, the flat surface required for the clip mounting seat will become larger, making it difficult to arrange the clip. This problem is suppressed with the invention.

By increasing the elastic piece deformation allowance, the force flat region F where reaction force is low is able to be formed across a wide deformation amount region in the characteristic of elastic piece deformation with respect to elastic piece reaction force, as shown in FIG. 7, and the proper engagement position R of the clip 10 with respect to the body 90 is able to be set in this flat region F. As a result, the reaction force is inhibited from abruptly increasing immediately after the elastic piece 50 contacts the body 90 when the clip 10 is inserted into the body 90. Therefore, it is possible to suppress the occurrence of non-engagement and partial engagement of the clip, which tends to occur with the clip of the related art in which the elastic piece reaction force increases abruptly such that it is difficult to determine whether the clip is pushed in all the way to near the proper engagement position. Also, a change in the plate thickness of the body 90 is easily absorbed. As a result, one type of clip 10 can be used with different types of vehicles, and even if the body plate thickness is thin, the necessary reaction force of the elastic piece 50 to stop rattling is able to be easily obtained.

Also, the engagement release lever 40 extends into the space between the two divided elastic pieces 50, so when removing the clip 10 during servicing or the like, the elastic pieces 50 will not impede operation of the engagement release lever 40. As a result, workability related to removing the clip improves. Also, the elastic pieces 50 are positioned at opposite sides across the engagement release lever 40, so the elastic pieces 50 are also effective in preventing the engagement release lever 40 from releasing due to the deployed CSA 88 contacting and pushing the engagement release lever 40. A space is provided between the two divided elastic pieces 50, so the width of each elastic piece 50 is able to be narrower. As a result, the rigidity of the elastic piece 50 is able to be reduced, so the height of the flat region F is able to be lower.

Further, the plane that includes the slanted portion 54 extends in the length direction of the pillar garnish 80, so the flat surface required for the clip mounting seat of the pillar 90 is smaller in only the length direction of the pillar garnish 80. As the flat surface required for the clip mounting seat is reduced, the pillar garnish 80 tends to become rattling in the length direction of the pillar garnish around the clip 10. However, the pillar garnish 80 is abutting against the pillar 90 in a position away from the clip 10 in the length direction of the pillar garnish, so rattling of the pillar garnish 80 in the length direction of the pillar garnish is not a problem. Neither the flat surface required for the clip mounting seat nor the external dimension L2 of the elastic piece is reduced in the width direction 80a of the pillar garnish 80. Therefore, rattling suppression of the pillar garnish 80 in the width direction 80a of the pillar garnish 80 is able to be maintained at the same degree as with the clip of the related art.

Also, the extended portion 56 or the protruding portion 60 is formed on at least one of the slanted portion 54 of the elastic piece 50 and the base 20, and extends toward the other of the slanted portion 54 and the base 20. For example, the extended portion 56 is formed on the slanted portion 54, and the protruding portion 60 is formed on the base 20. Therefore, the mountain M is able to be formed in the flat region F of the characteristic of elastic piece displacement with respect to elastic piece reaction force. Using this mountain M, non-engagement and partial engagement of the tether clip 10 with respect to the body 90 are able to be suppressed more than when the mountain M is not formed.

Further, with the pillar garnish mounting structure 1, the clip 10 is used, so the same or similar effects as those of the clip 10 is able to be obtained. The effects described above are able to be obtained in all of the example embodiments of the invention.

In the first example embodiment, the effects described below are able to be obtained in addition to those effects described above. The elastic piece 50 has the extended portion 56 that is folded back at the end portion of the slanted portion 54 and extends toward the base 20 side. The tip end portion 56a of the extended portion 56 faces the tip end portion 60a of the protruding portion 60 of the base 20. Therefore, the localized mountain M that appears when the tip end portion 56a of the extended portion abuts against the tip end portion 60a of the protruding portion of the base when the clip 10 is inserted into the body retaining hole 92 is able to be formed in the flat region F of the characteristic of elastic piece displacement with respect to elastic piece reaction force. The mountain M is able to be used to inhibit non-engagement and partial engagement of the clip 10 with respect to the body 90 in the flat region F.

[Second Example Embodiment]

Figure 8:
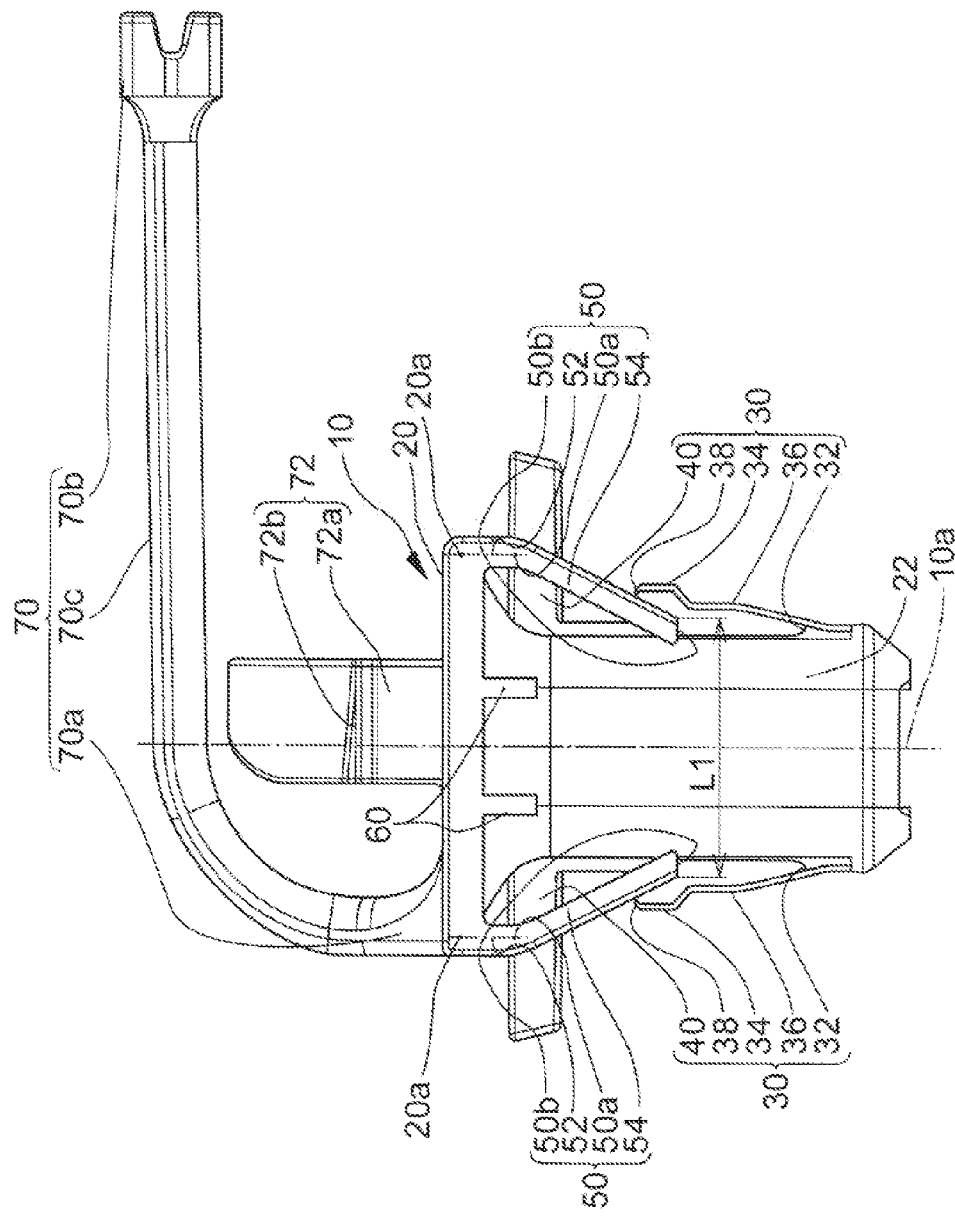
FIG. 8 is a front view of a clip according o a second example embodiment of the invention.
Figure 9:
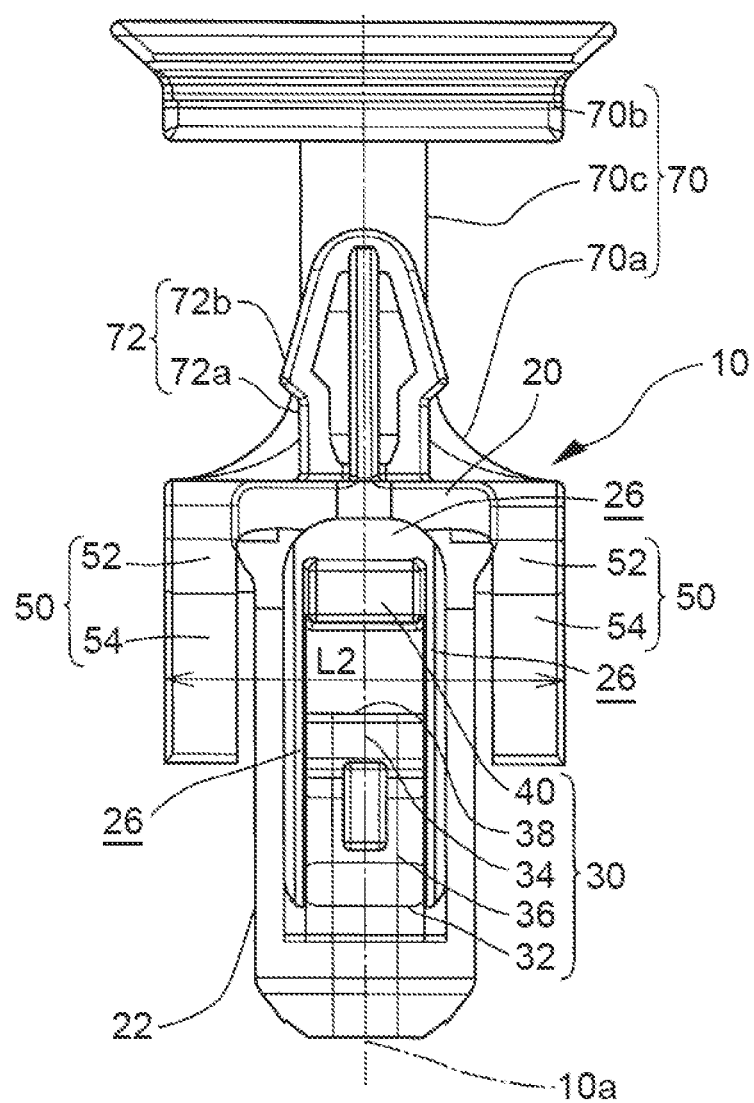
FIG. 9 is a side view of the clip shown in FIG. 8.
Figure 10:
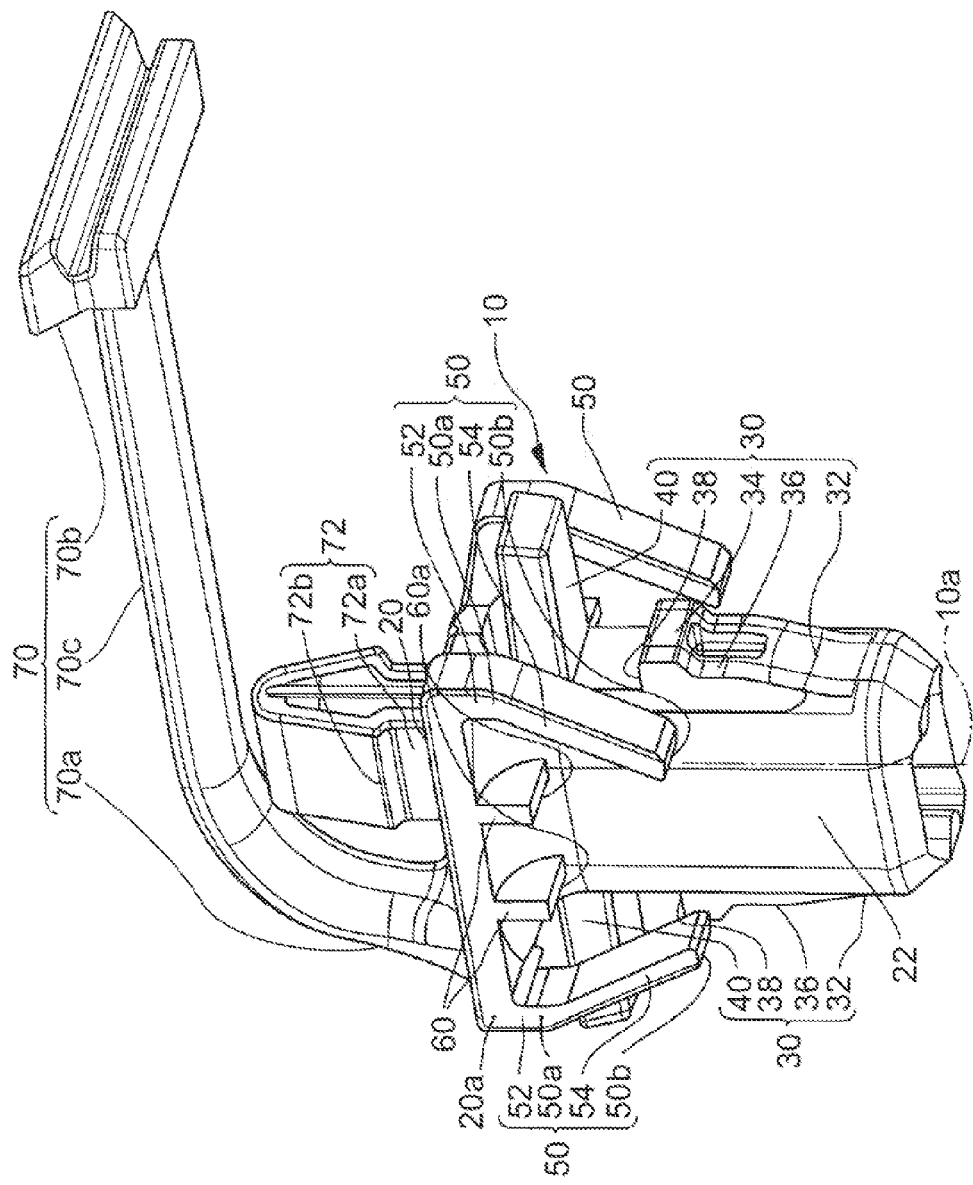
FIG. 10 is a perspective view of the clip shown in FIG. 8.

FIGS. 8 to 10 are views of a clip 10 according to a second example embodiment of the invention. FIG. 3 is a view applied correspondingly to the clip 10 of the second example embodiment of the invention. FIGS. 5 to 7 are views applied correspondingly to the pillar garnish mounting, structure 1 using the clip 10 according to the second example embodiment, and the characteristic thereof. The structure, operation, and effects that are able to be applied to all of the example embodiments of the invention in the first example embodiment of the invention may also be applied, or applied correspondingly, to the second example embodiment of the invention.

The second example embodiment of the invention has the structure, operation, and effects described below, in addition to the structure, operation, and effects that are able to be applied to all of the example embodiments of the invention in the first example embodiment of the invention. First, regarding the structure and operation, the elastic piece 50 is integrally formed with the base 20 as shown in FIGS. 8 to 10 and FIGS. 5 to 7. The elastic piece 50 has the axial portion 52 and the slanted portion 54, but does not have the extended portion 56. The base 20 has the protruding portion 60 that protrudes out toward the shaft portion 22 side.

The axial portion 52 of the elastic piece 50 extends in the clip axial direction from the base portion 20a positioned on an end portion of the base 20. The slanted portion 54 of the elastic piece 50 extends at an angle with respect to the base 20, from the elastic piece portion 50a positioned on an end portion of the axial portion 52 that is at a side away from the base 20, in a direction away from the base 20 in the clip axial direction and toward the clip central axis 10a, and ends in a free end. The elastic piece 50 is supported only at one end, so when the end portion 50b of the slanted portion 54 of the elastic piece 50 that is at the side away from the base 20 abuts against and is pushed by the body 90 when installing the clip 10 to the body 90, the elastic piece 50 easily deforms (bends). As a result, the elastic piece 50 has a flat region F where the reaction force is low, across a wider displacement region than with the clip of the related art, in the characteristic of elastic piece displacement with respect to elastic piece reaction force shown in FIG. 7.

The protruding portion 60 extends in a direction orthogonal to the base 20. The protruding portion 60 is provided in a position where it will be abutted against by the slanted portion 54 when the elastic piece 50 is pushed by the body 90 and elastically deforms toward the base 20 side when installing the clip 10 to the body 90. The protruding portion 60 extends in a direction away from the base 20 and ends in a free end. The protruding portion 60 is supported by only one end, so the bending rigidity is low, and as a result, the protruding portion 60 will bend when pushed on by the slanted portion 54. As a result, a mountain M in which the reaction force increases when the elastic piece 50 deforms and directly contacts the protruding portion 60, decreases as the protruding portion 60 deforms, appears in the flat region F in the characteristic of elastic piece displacement with respect to elastic piece reaction force shown in FIG. 7. The position and size of the mountain M are able to be set as desired, and are thus also able to be made similar to those of the mountain M in first example embodiment, by appropriately selecting the distance between the protruding portion 60 and the slanted portion 54, and the shape of the protruding portion 60, and the like.

By setting the position and size of the mountain M as desired, the mountain M is able to be used to inhibit non-engagement and partial engagement of the clip 10 with respect to the body retaining hole 92 in the flat region F. Also, the shapes of the elastic piece 50 and the protruding portion 60 are simpler than they are in the first example embodiment, so the clip 10 is easier to manufacture and costs are able to be drastically reduced.

[Third Example Embodiment]

Figure 11:
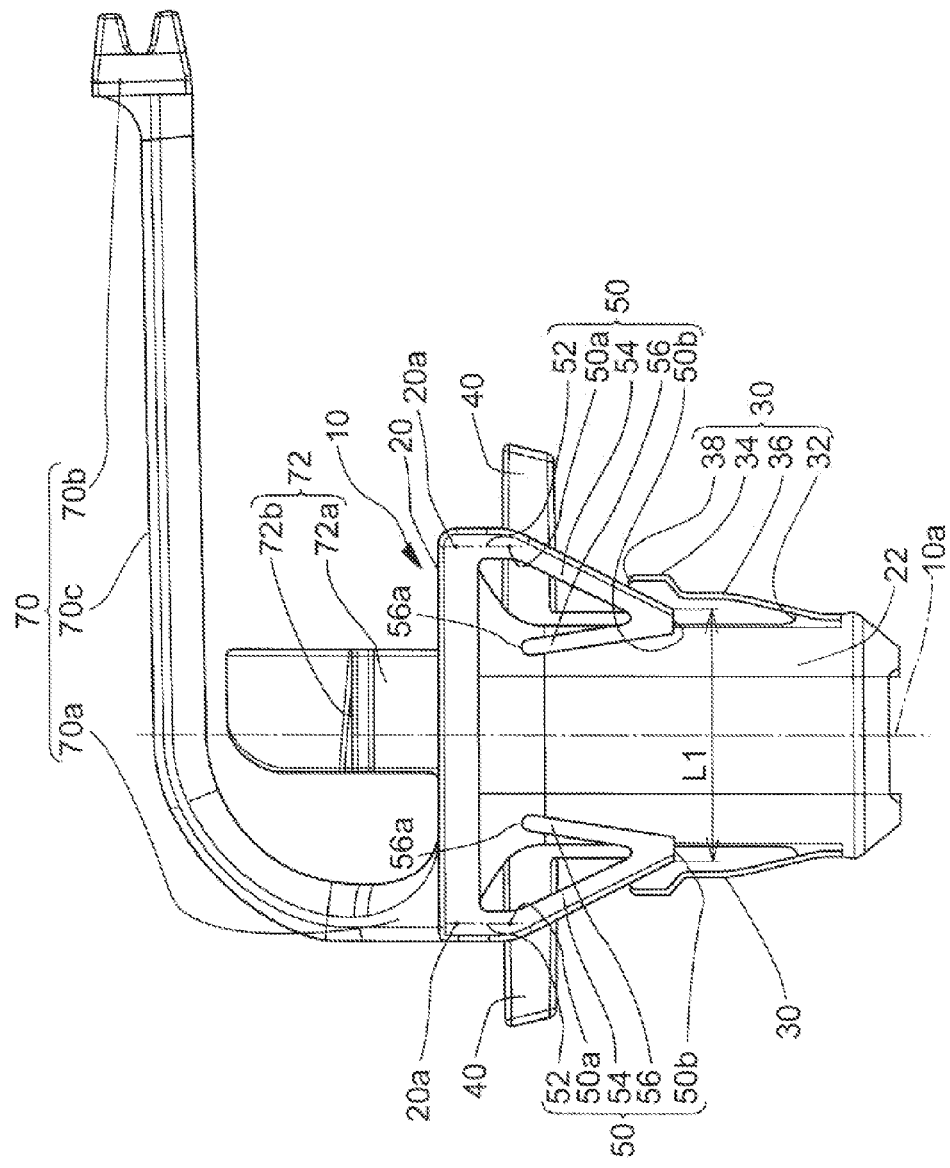
FIG. 11 is a front view of a clip according to a third example embodiment of the invention.
Figure 12:
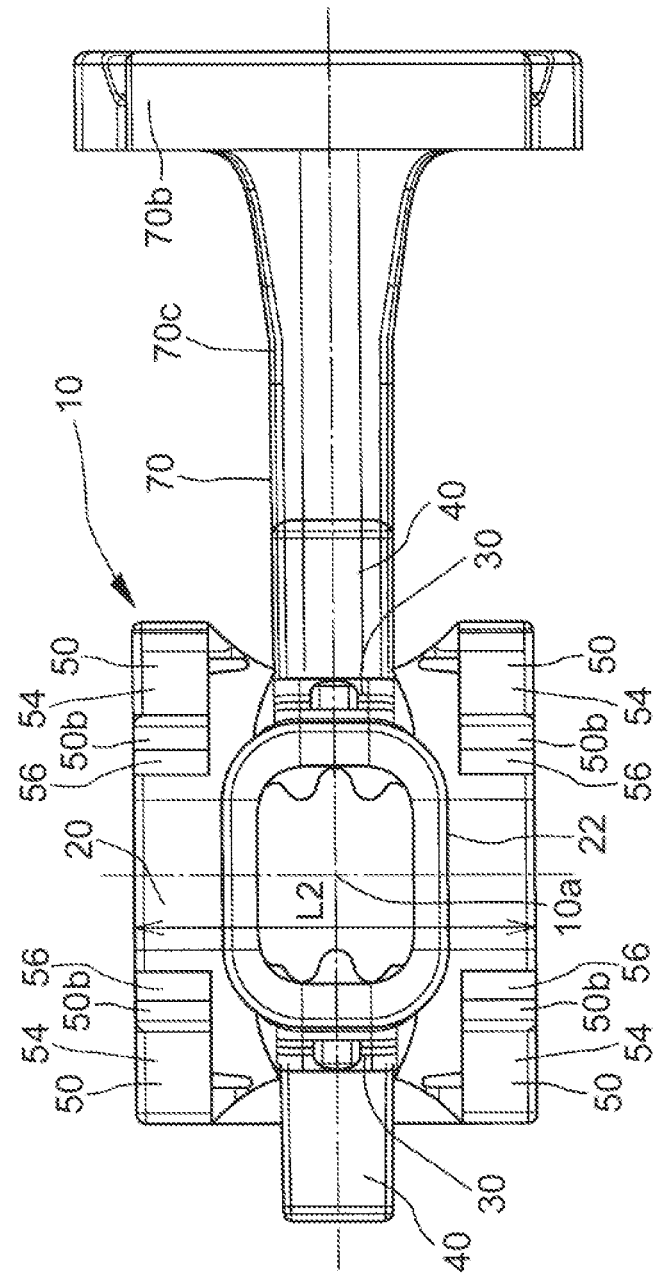
FIG. 12 is a bottom view of the clip shown in FIG. 11.

FIGS. 11 and 12 are views of a clip 10 according to a third example embodiment of the invention. FIGS. 5 to 7 are views applied correspondingly to the pillar garnish mounting structure 1 using the clip 10 of the third example embodiment and the characteristic thereof. The structure, operation, and effects that are able to be applied to all of the example embodiments of the invention in the first example embodiment of the invention are also able to be applied, or applied correspondingly m the third example embodiment of the invention.

The third example embodiment of the invention has the structure, operation, and effects described below, in addition to the structure, operation, and effects that are able to be applied to all of the example embodiments of the invention in the first example embodiment of the invention. First, regarding the structure and operation, the elastic piece 50 is integrally formed with the base 20 as shown in FIGS. 11 and 12 and FIGS. 5 to 7. The elastic piece 50 has the axial portion 52, the slanted portion 54 and the extended portion 56. The base 20 does not have a protruding portion that protrudes out toward the shaft portion 22 side.

The axial portion 52 of the elastic piece 50 extends in the clip axial direction from the base portion 20a positioned on an end portion of the base 20. The slanted portion 54 of the elastic piece 50 extends at an angle with respect to the base 20, from the elastic piece portion 50a positioned on an end portion of the axial portion 52 that is at a side away from the base 20, in a direction away from the base 20 in the clip axial direction, and toward the clip central axis 10a. The extended portion 56 extends at an angle with respect to the base 20 from the end portion 50b of the slanted portion 54 at the side away from the base 20, toward the base 20 and in the clip axial direction, as well as toward the clip central axis 10a. The elastic piece 50 is supported at only one end, so when the end portion 50b of the slanted portion 54 of the elastic piece 50 that is at the side away from the base 20 is pushed by the body 90 when installing; the clip 10 to the body 90, the elastic piece 50 easily deforms (bends) across a wide stroke with low reaction force at the base 20 side. As a result, the elastic piece 50 has a flat region F where the reaction force is low, across a wider displacement region than with the clip of the related art, in the characteristic of elastic piece displacement with respect to elastic piece reaction force shown in FIG. 7.

A protruding portion that protrudes out at the shaft portion 22 side is not provided on the base 20. Therefore, the tip end portion 56a of the extended portion 56 of the elastic piece 50 abuts directly against the base 20, so the reaction force of the elastic piece 50 increases, when the elastic piece 50 is pushed toward the base 20 side and consequently elastically deforms. When the elastic piece 50 is pushed even further toward the base 20 side, either the extended portion 56 will deform, or the tip end portion 56a of the extended portion 56 will slide on the base 20 and the reaction force of the elastic piece 50 will decrease. As a result, the mountain M will appear in the flat region F. The position and size of the mountain M are able to be set as desired, and are thus also able to be made similar to those of the mountain M in first example embodiment, by appropriately selecting the distance between the tip end portion 56a of the extended portion 56 and the base 20, and the thickness and rigidity and the like of the extended portion 56.

Regarding the effects, the mountain M is able to be used to inhibit non-engagement and partial engagement of the clip 10 with respect to the body 90 in the flat region F by setting the position and size of the mountain M as desired. Also, the shape of the base 20 with no protruding portion is simpler than that in the first example embodiment, so the clip 10 is easier to manufacture and costs are able to be drastically reduced.

What is claimed is:

1. A clip comprising:
   a base having a base portion that is separated from a clip central axis;
   an engagement release lever that extends in a direction away from the clip central axis; and
   a rattle inhibiting elastic piece provided adjacent to the base portion in a clip axial direction, and being divided into a first portion and a second portion that sandwich a plane that includes an extending direction of the engagement release lever and the clip axial direction;
   wherein
   the rattle inhibiting elastic piece has a slanted portion that extends at an angle with respect to the base from a rattle inhibiting elastic piece portion toward the clip central axis;
   the slanted portion has a tip end that abuts against an object and is pushed by the object when the clip is installed to the object such that the rattle inhibiting elastic piece deforms in a direction toward the base; and
   the engagement release lever extends in a space between the first portion and the second portion.

2. The clip according to claim 1, further comprising:
   a shaft portion that extends in a direction orthogonal to the base; and
   a retaining protrusion that has a connecting portion, a protruding portion, and a retaining surface,
   wherein the engagement release lever constitutes a part of the retaining protrusion, the connecting portion is connected to an outside surface of the shaft portion, the protruding portion has a sliding surface, is provided between the connecting portion and the base in the clip axial direction, and protrudes from the outside surface of the shaft portion, the sliding surface becomes farther away from the clip central axis as the protruding portion becomes close to the base, the retaining surface extends toward the clip central axis from a base side end portion of the sliding surface, and the tip end of the slanted portion is positioned between the sliding surface and the clip central axis, in a direction perpendicular to the clip central axis, when the clip is viewed from a direction perpendicular to the plane that includes the extending direction of the engagement release lever and the clip axial direction.

3. The clip according to claim 2, wherein the slanted portion is positioned between a connecting portion of the retaining surface and the sliding surface, and the clip central axis, in the direction perpendicular to the clip central axis, when the clip is viewed from the direction perpendicular to the plane that includes the extending direction of the engagement release lever and the clip axial direction.

4. The clip according to claim 1, wherein an extended portion that extends toward the base is formed on the slanted portion of the rattle inhibiting elastic piece.

5. The clip according to claim 1, wherein a protruding portion that extends toward the slanted portion is formed on the base.

6. The clip according to claim 1, wherein
an extended portion that extends toward the base is formed on the slanted portion of the rattle inhibiting elastic piece, and
a protruding portion that extends toward the slanted portion is formed on the base.

7. The clip according to claim 6, wherein the protruding portion that is formed on the base is provided in a position where a tip end portion of the extended portion directly contacts a tip end portion of the protruding portion when the rattle inhibiting elastic piece deforms toward the base.

8. The clip according to claim 7, wherein the protruding portion has a triangular shape and tapers away from the base.

9. The clip according to claim 1, wherein
the rattle inhibiting elastic piece has an axial portion that extends in the clip axial direction from the base portion, and
the rattle inhibiting elastic piece portion is positioned on an end portion of the axial portion.

10. The clip according to claim 1, wherein
the clip is a tether clip configured to mount a pillar garnish to a pillar;
the tether clip is attached to the pillar garnish; and
an extending direction of the slanted portion of the rattle inhibiting elastic piece is orthogonal to a width direction of the pillar garnish.

11. A pillar garnish mounting structure comprising:
the clip according to claim 1;
a pillar; and
a pillar garnish that is mounted to the pillar by the clip, wherein
the clip is a tether clip, and
an extending direction of the slanted portion of the rattle inhibiting elastic piece is orthogonal to a width direction of the pillar garnish.

12. The pillar garnish mounting structure according to claim 11, wherein
the clip further includes an engagement release lever that extends in a direction away from the clip central axis,
the rattle inhibiting elastic piece is divided into a first portion and a second portion that sandwich a plane that includes an extending direction of the engagement release lever and the clip axial direction, and
the engagement release lever extends in a space between the first portion and the second portion.

13. The pillar garnish mounting structure according to claim 12, wherein the clip further includes:
a shaft portion that extends in a direction orthogonal to the base; and
a retaining protrusion that has a connecting portion, a protruding portion, and a retaining surface,
the engagement release lever constitutes a part of the retaining protrusion,
the connecting portion is connected to an outside surface of the shaft portion,
the protruding portion has a sliding surface, is provided between the connecting portion and the base in the clip axial direction, and protrudes from the outside surface of the shaft portion,
the sliding surface becomes farther away from the clip central axis as the protruding portion becomes close to the base,
the retaining surface extends toward the clip central axis from a base side end portion of the sliding surface, and
the tip end of the slanted portion is positioned between the sliding surface and the clip central axis, in a direction perpendicular to the clip central axis, when the clip is viewed from a direction perpendicular to the plane that includes the extending direction of the engagement release lever and the clip axial direction.

14. The pillar garnish mounting structure according to claim 13, wherein
the pillar has a retaining hole,
the clip passes through the retaining hole,
the pillar is located between the retaining surface and the slanted portion in the clip axial direction, and
the retaining surface engages with the pillar.

15. The pillar garnish mounting structure according to claim 14, wherein the slanted portion is positioned between a connecting portion of the retaining surface and the sliding surface, and the clip central axis, in the direction perpendicular to the clip central axis, when the clip is viewed from the direction perpendicular to the plane that includes the extending direction of the engagement release lever and the clip axial direction.

16. The clip according to claim 1, wherein one end of the rattle inhibiting elastic piece is fixed to the rattle inhibiting elastic piece portion, and another end of the rattle inhibiting elastic piece is a free end.

17. The clip according to claim 1, further comprising
a shaft portion that extends in the clip axial direction, and
a retaining protrusion connected to the shaft portion.

18. The clip according to claim 1, further comprising
a shaft portion that extends in the clip axial direction, and
a retaining protrusion having a first end that is connected to the shaft portion in a position away from the base in the clip axial direction, and a second end that is closer to the base than the first end in the clip axial direction, wherein the second end of the retaining protrusion is closer to the base than the tip end of the slanted portion in the clip axial direction.

\* \* \* \* \*